(12) United States Patent
Inoue et al.

(10) Patent No.: US 8,304,735 B2
(45) Date of Patent: Nov. 6, 2012

(54) RADIATION DETECTING APPARATUS AND RADIATION DETECTING SYSTEM

(75) Inventors: Masato Inoue, Kumagaya (JP); Satoshi Okada, Zama (JP); Shinichi Takeda, Honjo (JP); Kazumi Nagano, Fujisawa (JP); Keiichi Nomura, Honjo (JP); Satoru Sawada, Kodama-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 489 days.

(21) Appl. No.: 12/528,580

(22) PCT Filed: Apr. 9, 2008

(86) PCT No.: PCT/JP2008/057374
§ 371 (c)(1),
(2), (4) Date: Aug. 25, 2009

(87) PCT Pub. No.: WO2008/133123
PCT Pub. Date: Nov. 6, 2008

(65) Prior Publication Data
US 2010/0102236 A1   Apr. 29, 2010

(30) Foreign Application Priority Data

Apr. 18, 2007   (JP) ................. 2007-109469
Mar. 27, 2008   (JP) ................. 2008-083387

(51) Int. Cl.
*G01J 5/28* (2006.01)
(52) U.S. Cl. ................................. 250/361 R
(58) Field of Classification Search ............. 250/361 R
See application file for complete search history.

(56) References Cited

U.S. PATENT DOCUMENTS

| | | | | |
|---|---|---|---|---|
| 5,308,980 A | * | 5/1994 | Barton ................. | 250/338.4 |
| 5,585,624 A | * | 12/1996 | Asatourian et al. ....... | 250/216 |
| 5,600,140 A | * | 2/1997 | Asatourian ............. | 250/332 |
| 5,610,389 A | * | 3/1997 | Asatourian ............. | 250/216 |
| 5,714,760 A | * | 2/1998 | Asatourian ............. | 250/352 |

(Continued)

FOREIGN PATENT DOCUMENTS

CN   1530667   9/2004

(Continued)

OTHER PUBLICATIONS

Office Action issued May 15, 2012, in counterpart Chinese Patent Application No. 200880011911.7, with translation.

*Primary Examiner* — David Porta
*Assistant Examiner* — Djura Malevic
(74) *Attorney, Agent, or Firm* — Fitzpatrick, Cella, Harper & Scinto (57) ABSTRACT

To reduce peeling between members constituting an radiation detecting apparatus, the radiation detecting apparatus of the present invention includes a laminating layered structure in which a supporting substance, an adhesive layer, an array substrate having a photoelectric conversion element, a scintillator layer for converting a radiation into light and a resin layer are stacked in this order. Of arrangement regions of each layer in a plane direction, an arrangement region of the scintillator layer is broader than the region opposed to a photoelectric conversion element, and an arrangement region of the adhesive layer is the same as or broader than the arrangement region of the photoelectric conversion element and at least a portion of the arrangement region of the adhesive layer is narrower than that of the scintillator layer.

22 Claims, 6 Drawing Sheets

U.S. PATENT DOCUMENTS

| | | | |
|---|---|---|---|
| 5,856,699 A | 1/1999 | Hayashi et al. | 257/433 |
| 7,067,817 B2 * | 6/2006 | Suganuma et al. | 250/370.11 |
| 7,105,830 B2 | 9/2006 | Nagano et al. | 250/370.11 |
| 7,205,547 B2 | 4/2007 | Ishii et al. | 250/370.09 |
| 7,205,568 B2 | 4/2007 | Watanabe et al. | 257/59 |
| 7,391,029 B2 | 6/2008 | Takeda et al. | 250/370.11 |
| 7,435,968 B2 | 10/2008 | Watanabe et al. | 250/370.14 |
| 7,488,948 B2 | 2/2009 | Ishii et al. | 250/370.11 |
| 7,514,686 B2 * | 4/2009 | Ogawa et al. | 250/361 R |
| 7,535,506 B2 | 5/2009 | Nomura et al. | 348/308 |
| 7,538,330 B2 | 5/2009 | Nomura et al. | 250/370.11 |
| 7,541,617 B2 | 6/2009 | Mochizuki et al. | 257/72 |
| 7,557,355 B2 | 7/2009 | Mochizuki et al. | 250/370.09 |
| 7,595,493 B2 | 9/2009 | Okada et al. | 250/370.11 |
| 7,605,374 B2 * | 10/2009 | Hoggatt et al. | 250/368 |
| 7,718,974 B2 * | 5/2010 | Schulz et al. | 250/370.11 |
| 7,982,190 B2 * | 7/2011 | Homma et al. | 250/370.11 |
| 2002/0195568 A1 * | 12/2002 | Mori et al. | 250/370.11 |
| 2003/0173493 A1 * | 9/2003 | Homme et al. | 250/200 |
| 2004/0178350 A1 | 9/2004 | Nagano et al. | 250/370.11 |
| 2004/0195514 A1 * | 10/2004 | Nagano | 250/370.11 |
| 2004/0211910 A1 * | 10/2004 | Izumi et al. | 250/370.11 |
| 2004/0211911 A1 * | 10/2004 | Hata | 250/370.11 |
| 2005/0056789 A1 * | 3/2005 | Spahn et al. | 250/370.09 |
| 2005/0167604 A1 * | 8/2005 | Suganuma et al. | 250/370.11 |
| 2006/0108683 A1 * | 5/2006 | Takeda | 257/723 |
| 2007/0146520 A1 | 6/2007 | Watanabe et al. | 348/308 |
| 2007/0181252 A1 * | 8/2007 | Bohm et al. | 156/297 |
| 2007/0205371 A1 | 9/2007 | Inoue | 250/370.11 |
| 2008/0308739 A1 | 12/2008 | Sawada et al. | 250/370.11 |
| 2009/0040310 A1 | 2/2009 | Nomura et al. | 348/162 |
| 2009/0127435 A1 | 5/2009 | Mochizuki et al. | 250/208.1 |
| 2009/0185659 A1 | 7/2009 | Ishii et al. | 378/114 |
| 2009/0230311 A1 | 9/2009 | Mochizuki et al. | 250/370.09 |
| 2009/0283685 A1 | 11/2009 | Takeda et al. | 250/370.11 |

FOREIGN PATENT DOCUMENTS

JP    2005-214808    8/2005

* cited by examiner

RADIATION DETECTING APPARATUS AND RADIATION DETECTING SYSTEM

TECHNICAL FIELD

The present invention relates to a radiation detecting apparatus and a radiation detecting system and, in particular, a radiation detecting apparatus and a radiation detecting system used for radiography and the like.

BACKGROUND ART

Conventionally, a radiation detecting apparatus including a radiation film having a radiation intensifying screen and a photosensitive layer having a scintillator layer for converting X-rays into light has been generally used in radiographing.

However, there has been recently developed a digital radiation detecting apparatus having a scintillator having a scintillator layer and a two-dimensional photo detector having a photoelectric conversion element. In the digital radiation detecting apparatus, since data obtained is digital data, image processing is easily performed. Accordingly, by incorporating such digital radiation detecting apparatus into a networked computer system, the data can be shared. In addition, there is the following other advantage: storage of image digital data into a magneto-photo disk or the like can decrease required storage space quite remarkably as compared with storage of films, thus facilitating retrieval of past images. Further, as development of digital radiation detecting apparatuses has advanced, such digital radiation detecting apparatuses having characteristics of high sensitivity and high sharpness have been proposed, which has enabled reduction in the patient's radiation exposure doses.

As a conventional example of a digital radiation detecting apparatus, one example of a configuration is described in U.S. Pat. No. 5,856,699. U.S. Pat. No. 5,856,699 describes that a scintillator layer (wavelength conversion member) for converting X-rays into visible light is disposed on an X-ray-incident side of a semiconductor element substrate having a plurality of photoelectric conversion elements arranged in a two-dimensional manner, and a surface on the opposite side to the X-ray-incident side of the semiconductor element substrate is fixed on a base through an adhesive agent.

In addition, Japanese Patent Application Laid-open No. 2005-214808 describes an example in which a scintillator layer made of a number of columnar crystals made of CsI doped with Tl, with high light-emitting efficiency, are arranged on a surface on the X-ray-incident side of the photoelectric conversion element substrate, and the back face of the photoelectric conversion element substrate is fixed on a mount substrate with an adhesive agent. Further, the scintillator layer is covered with a moisture-proof protective film.

DISCLOSURE OF THE INVENTION

However, the conventional technologies described above cause the following problems: the protective film, the scintillator layer, the photoelectric conversion element substrate and the adhesive agent for joining the base have different coefficients of thermal expansion from each other, so that stress is generated at each portion by surrounding environment temperature and heat generation inside the apparatus. Moreover, the difference between the stresses generates a force causing deformation in a protruding or recessing direction. Particularly, a large temperature difference between manufacturing processes for forming respective members has already generated stresses under use environments of apparatuses. In the conventional example, an existing stress is forcibly corrected by another member, thus balancing, but not eliminating, the force which would otherwise have produced the deformation.

Accordingly, peeling between joining surfaces of the scintillator layer and the photoelectric conversion element substrate having low adhesive force and breakage inside the scintillator layer are apt to occur. In particular, there is a high possibility of peeling or breakage at a corner portion to which large stress is applied.

If peeling or breakage of the scintillator layer occurs, the light generated at the inside of the scintillator layer is not transmitted exactly, and a light intensity change or light scattering occurs, thus lowering light intensity and resolution.

In view of the foregoing problems, it is an object of the present invention to provide a radiation detecting apparatus capable of reducing peeling between an array substrate and a scintillator layer, caused by a difference in coefficients of thermal expansion between members.

According to a first aspect of the present invention, a radiation detecting apparatus comprises a laminating layered structure in which a supporting substance, a first adhesive layer, an array substrate having a photoelectric conversion element, a scintillator layer for converting a radiation into light, a first resin layer are stacked in this order, and where, in an arrangement region in a direction of a plane of each of the layers, an arrangement region of the scintillator layer is broader than an arrangement region of the photoelectric conversion element, an arrangement region of the first adhesive layer is the same as or broader than an arrangement region of the photoelectric conversion element, and has a portion narrower than the arrangement region of the scintillator layer, and an arrangement region of the array substrate is broader than the arrangement region of the scintillator layer.

Furthermore, the present invention provides a radiation detecting system that includes at least the radiation detecting apparatus described above and a signal processing unit for processing a signal from the radiation detecting apparatus.

The present invention can reduce peeling of the scintillator layer of the radiation detecting apparatus and can prevent light intensity degrading and resolution degrading.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

BEST MODE FOR CARRYING OUT THE INVENTION

Referring now to the accompanying drawings, description will be made of a radiation detecting apparatus and a radiation detecting system according to the present invention and particularly, of one embodiment in a case where the radiation to be detected is X-rays. For present purposes, the term "radiation" is meant to encompass X-rays, particulate beams such as α-rays and β-rays, and γ-rays.

Figure 1:
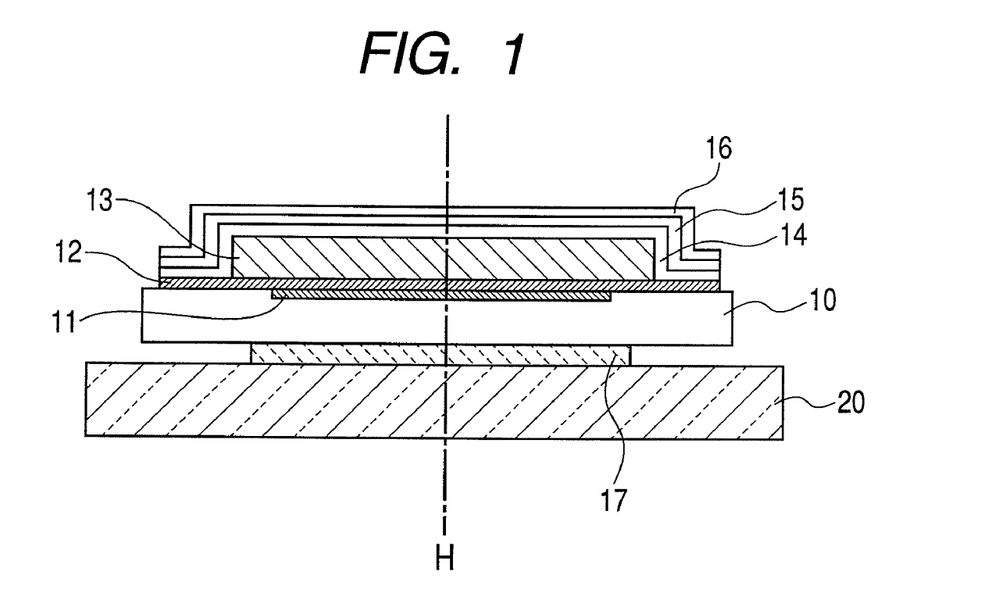
FIG. 1 is a simplified sectional view of a radiation detecting apparatus according to the present invention.

FIG. 1 is a sectional view of a radiation detecting apparatus according to one embodiment of the present invention. On an array substrate 10, photoelectric conversion elements 11 (only one is shown) for converting light into an electric signal are disposed in a two-dimensional arrangement. On the photoelectric conversion element 11, an insulation layer 12 is disposed. On the insulation layer 12, a scintillator layer 13 for converting X-rays into visible light is disposed. Further, the following respective layers are layered adjacent to each other so as to cover the scintillator layer 13. That is, a resin layer (polyolefin-group hot-melt resin layer may be used as thermoplastic resin) 14, a metallic layer 15 as an electromagnetic shield substance and a base 16 of the metallic layer 15 are laminated together, in the stated order. The array substrate 10 and the supporting substance 20 are laminated together by means of an intervening first adhesive layer 17.

In FIG. 1, the scintillator layer 13 is a layer of columnar crystal formed by vapor deposition of a substance having an activator added to a main ingredient on the insulation layer 12. That is, the scintillator layer 13 has a columnar crystal structure. As the main ingredient, cesium iodide (CsI) may be used. As the activator, thallium (Tl) may be used. In addition, the activator may use sodium (Na) as well. Formation of the scintillator layer 13 can be performed, for example, by concurrently vapor depositing CsI as the main ingredient from an evaporating source and thallium iodide (TlI) as the doping material. The vapor deposition is generally performed at a high temperature, within the range of 100 to 300° C.

As the first resin layer 14, all that is needed is thermoplastic resin. Hot-melt resin is favorably used, and in particular a polyolefin-group resin is preferably used. The first resin layer 14 is not limited to polyolefin-group resin, however, and use of another hot-melt resin such as a polyester-group, polyurethane-group or epoxy-group resin also provides the same advantage. The coefficient of thermal expansion of the hot-melt resin varies with material type, for example, 160 to 230×10⁻⁶/° C.

Further, the first adhesive layer 17 may use an adhesive agent belonging to the group of acryl-series, epoxy-series and silicon-series resins. The coefficient of thermal expansion of the adhesive agent varies with material type, for example, 110×10⁻⁶/° C. or less.

Preferably, the material of the base 16 in FIG. 1 is a polyethylene-group resin such as polyethylene terephthalate (PET). However, the material of the base is not limited to polyethylene-group resins, and other resins such as acrylic resin, phenol resin, polyvinyl chloride, polypropylene resin, polycarbonate resin and cellulose resin may be used.

In addition, for the metallic layer 15, aluminum is favorably used. The metallic layer 15 is electromagnetic shielding and, so long as an electromagnetic shielding effect is produced, the material is not limited to aluminum, and a metal such as silver, silver alloy, copper and gold may be used. The metallic layer 15 also functions as a reflective layer to reflect light from the scintillator layer 13.

A feature of the present invention is that there is a difference between arrangement regions of the scintillator layer 13 and the first adhesive layer 17. Specifically, the arrangement region of the scintillator layer 13 is broader than that of the photoelectric conversion element 11. The arrangement region of the first adhesive layer 17 is the same as or broader than that of the photoelectric conversion element 11, and at least a portion of the arrangement region of the first adhesive layer 17 is narrower than that of the scintillator layer 13. Now, detailed description will be made of a feature portion thereof. The term "arrangement region" as used herein denotes the regions where the first adhesive layer 17, the scintillator layer 13 and the photoelectric conversion element 13, respectively, are projected on the supporting substance 20.

Figure 2:
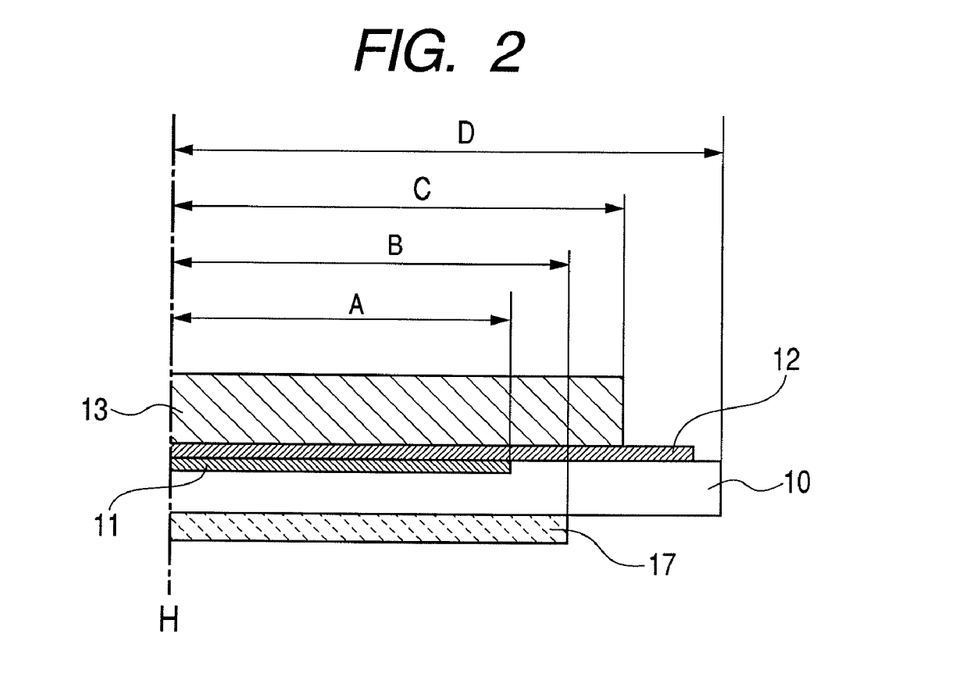
FIG. 2 is a simplified sectional view of a sheet-like buffering substance according to the present invention.

Referring to FIG. 2, which is a sectional view limited to members and a configuration thereof required to describe features of the present invention, detailed description will be made of the features. FIG. 2 illustrates an arrangement relationship of respective members based on a broken line H as the vertical center line of the radiation detecting apparatus in FIG. 1. Specifically, FIG. 2 illustrates an arrangement region of each layer in a plane direction. Symbol A denotes an arrangement region of the photoelectric conversion element 11, from broken line H. Symbol B denotes an arrangement region of the first adhesive layer 17 from the broken line H. Similarly, symbol C denotes an arrangement of the scintillator layer 13 from the broken line H. Symbol D denotes an arrangement region of the array substrate 10 from the broken line H.

In the present invention, at least a part of a first adhesive layer region (B) disposed on the supporting substance 20 side of the array substrate 10 is disposed at the same position as an outer periphery portion of an arrangement region (A) of the photoelectric conversion element 11, or outward from the outer periphery portion of the arrangement region (A). Further, at least a part of an outer periphery portion of an arrangement region (B) of the first adhesive layer 17 is disposed inward of an outer periphery portion of an arrangement region (C) of the scintillator layer 13. The outer-periphery portion of the arrangement region (B) of the first adhesive layer 17 is disposed inward of an outer-periphery portion of an arrangement region (D) of the array substrate 10. Further, the outer-periphery portion of the arrangement region (C) of the scintillator layer 13 is disposed outward of the outer-periphery of the arrangement region (A) of the photoelectric conversion element 11 and is inward of the outer-periphery portion of the arrangement region (D) of the array substrate 10. Specifically, these regions have the following relationship:

$$A \leq B < C < D \qquad \text{relation (1)}$$

As seen from the above relation (1), distances from the center line H to the outer-periphery portions of arrangement regions of the respective layers have the relationship that (B) is equal to or longer than (A), (C) is longer than (B) and (D)

is longer than (C). To put it the other way around, (A) is equal to or shorter than (B), (B) is shorter than (C) and (C) is shorter than (B).

Preferably, regions of at least a part of the first adhesive layer 17 disposed on the supporting substance side of the array substrate 10 satisfying relation (1) are at least four corner portions of a radiation detection unit.

An arrangement of respective members satisfying conditions of relation (1) provides the following effect even if stress occurs due to a change in use environment temperatures, and each member changes to form a protrusion or recess shape. Specifically, in a region outward of the arrangement region (B) of the adhesive layer 17 in which peeling or breakage might begin to occur at the scintillator layer, the array substrate 10 is not connected with the supporting substance 20. Accordingly, a member disposed above the array substrate 10 is not corrected by the supporting substance 20 of a rigid body. Even if a difference exists between the coefficient of thermal expansion of the array substrate 10 and those of the first resin layer 14, the metallic layer 15 and the base 16, there is no influence of the supporting substance 20, which relieving an influence of stress applied to the scintillator layer. Accordingly, no peeling occurs between the scintillator layer 13 and the insulation layer 12, and no structural breakage occurs inside the scintillator layer 13.

Figure 3:
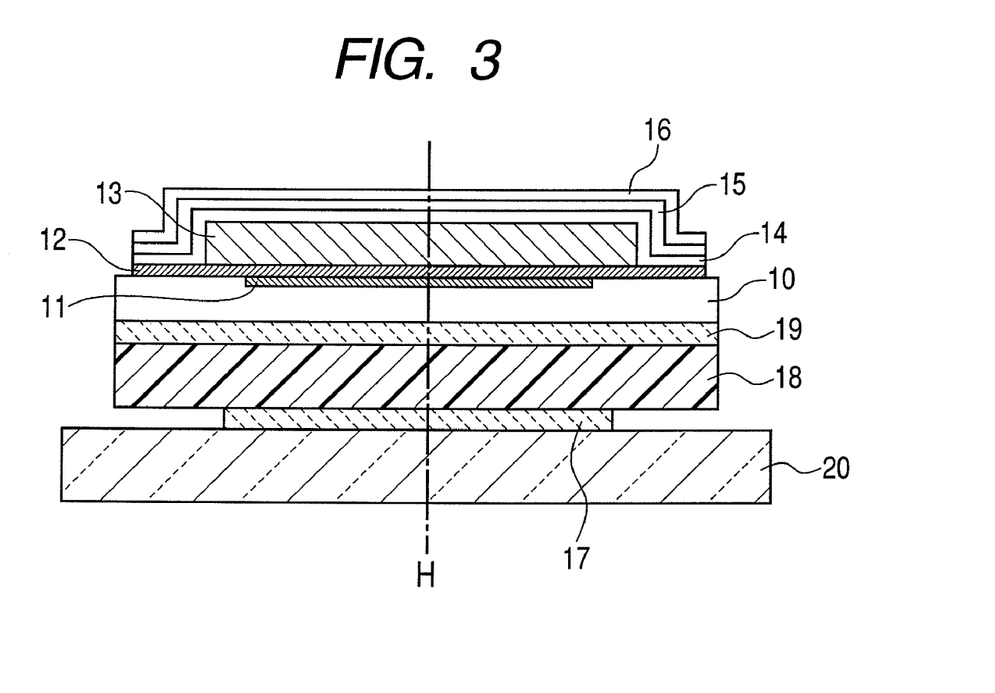
FIG. 3 is a simplified sectional view of a radiation detecting apparatus for description of positional relationships between respective members according to the present invention.

FIG. 3 is a sectional view of an X-ray detecting apparatus according to another embodiment of the present invention. The array substrate 10 is two-dimensionally disposed with the photoelectric conversion element 11 for converting light into an electric signal. Moreover, adjacent to the photoelectric conversion element 11, there is disposed the insulation layer 12. Moreover, adjacent to the insulation layer 12, there is disposed the scintillator layer 13 for converting X-ray into visible light. Further, the following respective layers are layered in order, adjacent to thereof so as to cover the scintillator layer 13. Specifically, the first resin layer (polyolefin-group hot-melt resin layer of thermoplastic resin) 14, the metallic layer 15 of an electromagnetic shield substance and the base 16 of the metallic layer 15 are layered in the stated order. The array substrate 10 and the second resin layer 18 having light shielding and buffering are provided, adjacent to each other with the second adhesive layer 19 in between. The resin layer 18 and the supporting substance 20 are provided, adjacent to each other with the first adhesive layer 17 in between. As shown, the arrangement region of the second resin layer 18 and the second adhesive layer 19 is broader than the arrangement region of the scintillator layer 13. Also, the shapes and sizes of the second resin layer 18 and the second adhesive layer 19 are similar to the shape and size of the array substrate 10.

In FIG. 3, the scintillator layer 13 is a layer of columnar crystal formed by vapor depositing a substance having an activator added to a main ingredient on the insulation layer 12. That is, the scintillator layer 13 has a columnar crystal structure. As the main ingredient, cesium iodide (CsI) may be used. As the activator, thallium (Tl) may be used. In addition, the activator may use sodium (Na) as well. Formation of the scintillator layer 13 can be performed, for example, by concurrently vapor depositing CsI as the main ingredient from an evaporating source and thallium iodide (TlI) as a doping material. The vapor deposition is generally performed at a high temperature, within the range of 100 to 300° C.

As the first resin layer 14, all that is needed is thermoplastic resin. Hot-melt resin is favorably used, and in particular, a polyolefin-group resin is preferably used. The first resin layer 14, in the case of hot-melt resin, is not limited to a polyolefin-group resin, and use of a hot-melt resin such as a polyester-group, polyurethane-group or epoxy-group resin also provides the same advantage. The coefficient of thermal expansion of the hot-melt resin varies with material type, for example, 160 to $230 \times 10^{-6}$/° C.

The first adhesive layer and the second adhesive layer may use an adhesive agent belonging to any of acrylic-group, epoxy-group and silicon-group. The coefficient of thermal expansion of the adhesive agent varies with material type, for example, $110 \times 10^{-6}$/° C. or less.

Preferably, the material of the base 16 in FIG. 1 is a polyethylene-group resin such as polyethylene terephthalate (PET). However, the material is not limited to polyethylene-group resins, and other resins such as acrylic resin, phenol resin, polyvinyl chloride, polypropylene resin, polycarbonate resin and cellulose resin may be used.

In addition, for the metallic layer 15, aluminum is favorably used. The metallic layer 15 provides electromagnetic shielding and, provided an electromagnetic shielding effect is produced, the material thereof is not limited to aluminum, and metals such as silver, silver alloy, copper and gold may be used. The metallic layer 15 also functions as a reflective layer to reflect light from the scintillator layer 13.

Figure 4:
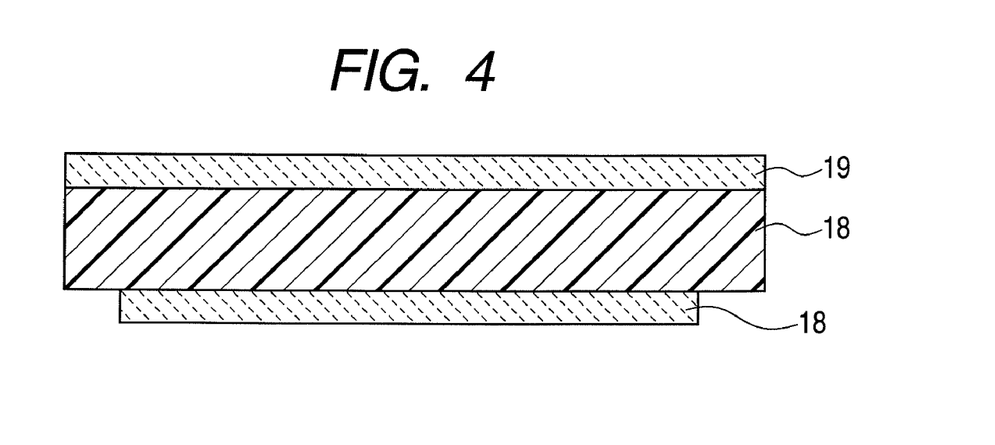
FIG. 4 is a simplified sectional view of a radiation detecting apparatus according to the present invention when stress is applied.

FIG. 4 illustrates a sheet-like buffering substance having the second resin layer 18, the second adhesive layer 19 and the first adhesive layer 17, where a separator is usually mounted on each adhesive layer surface for operation in an easy-to-handle shape. The second resin layer has a buffering performance with a foaming structure and a light shielding performance for absorbing the surplus light penetrating through the photoelectric conversion element array substrate 10 of the light emitted by the scintillator layer 13. Thus, incidence of the reflective light from behind the photoelectric conversion element array substrate 10 into the photoelectric conversion element 11 is suppressed.

A feature of the present embodiment is that there are differences in shape and size between the second adhesive layer 19 and the first adhesive layer 17 in FIG. 4, thus describing a feature portion thereof in detail.

Figure 5:
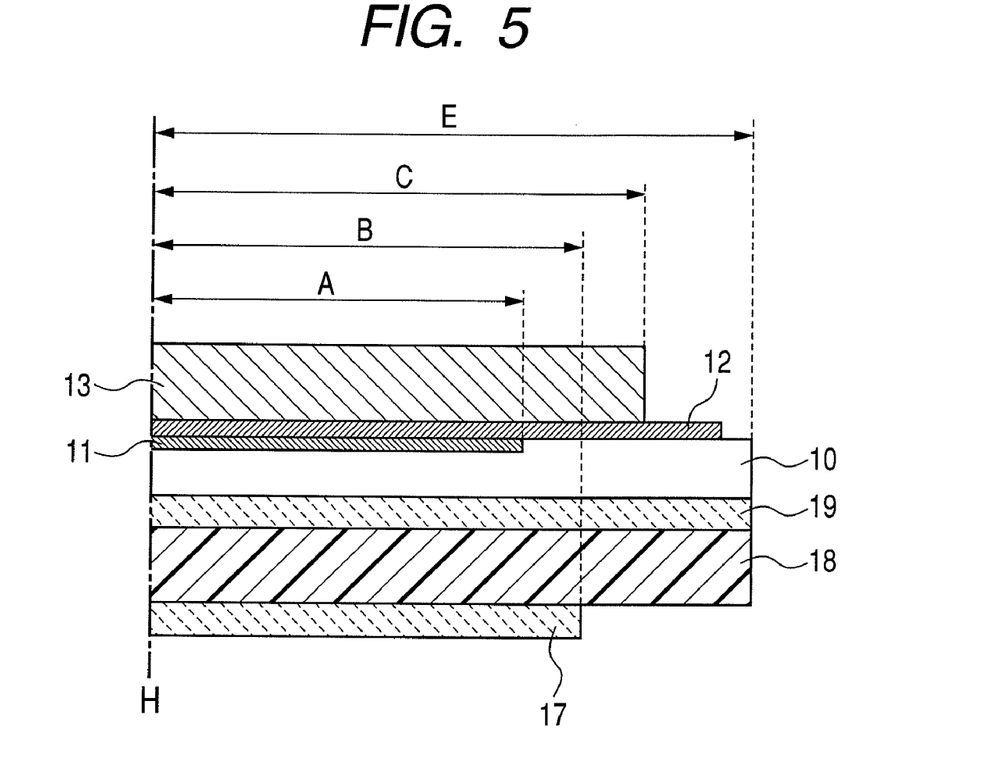
FIG. 5 is a view illustrating the shape of a first adhesive layer according to the present invention.

Referring to FIG. 5 of a sectional view limited to members and a configuration thereof required to describe features of the present invention, detailed description will be made. FIG. 5 illustrates an arrangement relationship of respective members based on broken line H as the vertical center line of the radiation detecting apparatus in FIG. 3. Specifically, FIG. 5 illustrates an arrangement region of each layer in a plane direction. More specifically, it is most preferable that the broken line H is taken as the central portion of a scintillator layer. That is the reason why peeping-off or breakage at a corner portion of the scintillator layer is easy to be understood. Symbol A denotes the arrangement region of the photoelectric conversion element 11 from broken line H. Symbol B denotes the arrangement region of the first adhesive layer 17 from the broken line H. Similarly, symbol C denotes the arrangement region of the scintillator layer 13 from the broken line H. Symbol D denotes the arrangement region of the second adhesive layer 19 from the broken line H.

In the present invention, at least a part of an outer-periphery portion of an arrangement region (B) of the first adhesive layer 17 disposed on the supporting substance side of the second resin layer 18 is disposed at a position the same as or outward from an outer-periphery portion of an arrangement region (A) of the photoelectric conversion element 11. Further, at least a part of the outer periphery portion of the arrangement region (B) of the first adhesive layer 17 is disposed inward from the outer periphery portion of the arrangement region (C) of the scintillator layer 13. Further, the outer periphery portion of the arrangement region (B) of the first adhesive layer 17 is disposed inward from the outer periphery portion of an arrangement region (E) of the second adhesive layer 19 disposed on the photoelectric conversion element array substrate 10 side of the second resin layer 18. Further, the outer-periphery portion of the arrangement region (C) of the scintillator layer 13 is disposed outward from the arrangement region (A) of the photoelectric conversion element 11 and inward of the outer-periphery portion of the arrangement region (E) of the second adhesive layer 19. Specifically, these arrangement area dimensions have the relationship given by the following relation (2):

$$A \leqq B < C < E \qquad \text{relation (2)}$$

However, regions of at least a part of the first adhesive layer 17 disposed on the supporting substance side of the second resin layer 18 satisfying relation (2) are at least four corner portions of an X-ray detection unit.

Figure 6:
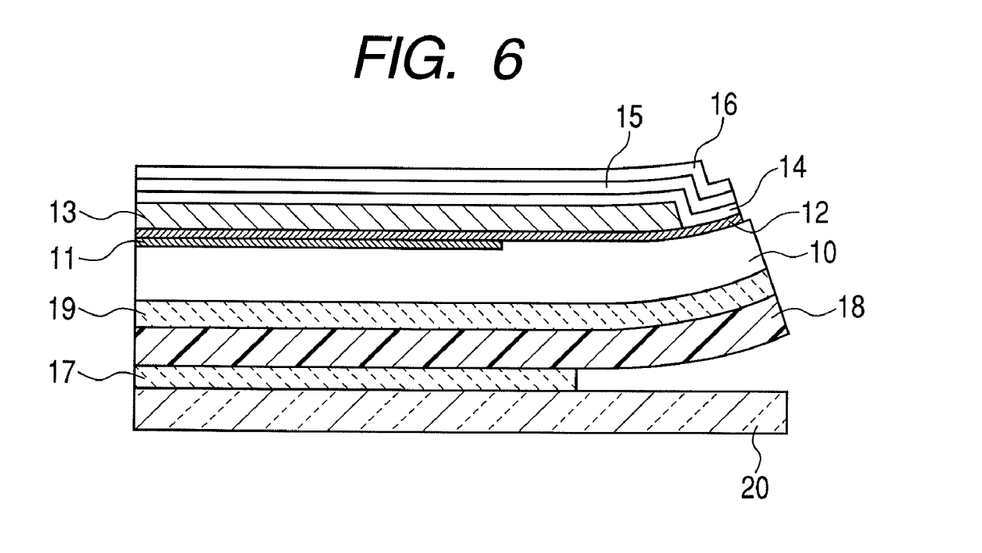
FIG. 6 is a view illustrating another shape of a first adhesive layer according to the present invention.

FIG. 6 illustrates a state in which an apparatus in FIG. 3 has a warp. An arrangement of respective members satisfying relation (2) provides the following effect even if stress occurs due to a change in use environment temperatures and each member changes into a protrusion or recess shape. Specifically, in a region outward from the arrangement region (B) of the adhesive layer 17 in which peeling or breakage might begin to occur at the scintillator layer, the second resin layer 18 is not connected with the supporting substance 20. Accordingly, a member disposed above the second resin layer 18 is not corrected by the supporting substance 20 as a rigid body. Even if a difference exists between the coefficient of thermal expansion of the photoelectric conversion element array substrate 10 and those of the first resin layer 14, the metallic layer 15 and the base 16, there is no influence of the supporting substance 20 relieving an influence of stress applied to the scintillator layer. Accordingly, no peeling occurs between the scintillator layer 13 and the insulation layer 12, and no structural breakage occurs inside the scintillator layer 13.

The first adhesive layer 17 can have various types of shapes, provided that relation (2) is satisfied. Referring now to FIGS. 7 to 11, description will be made of the embodiments thereof.

Figure 7:
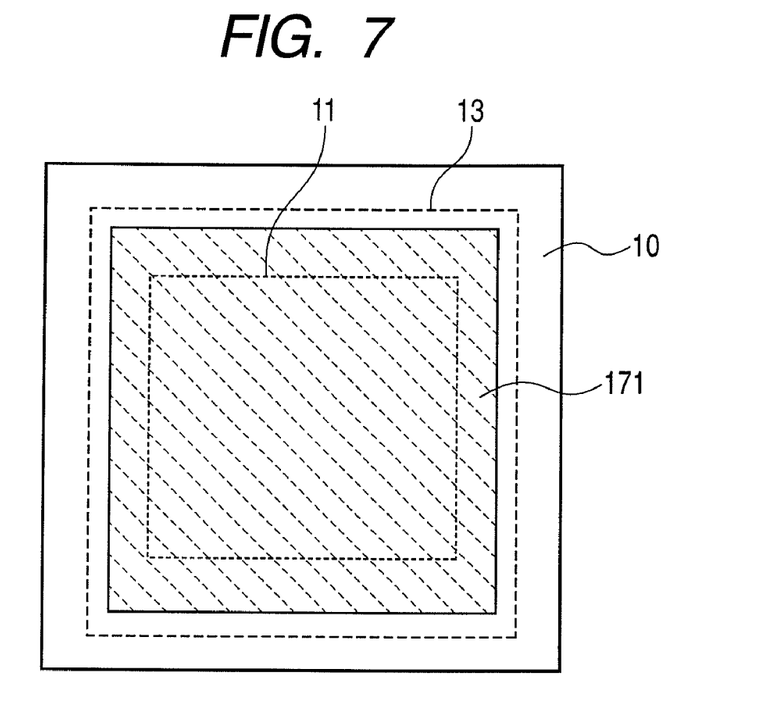
FIG. 7 is a view illustrating another shape of a first adhesive layer according to the present invention.

FIG. 7 illustrates a first adhesive layer 171, the array substrate 10, the photoelectric conversion element 11 disposed on the array substrate 10 and the scintillator layer 13, when viewed from the supporting substance 20 side. The first adhesive layer 171 is disposed in the same rectangular shape as the array substrate 10, within a region of the rectangular array substrate 10. An arrangement region of the first adhesive layer 171 used herein is a region satisfying relation (1). The array substrate 10 may be considered by replacement with the second resin layer. In this case as well, the arrangement region of the first adhesive layer 171 is a region satisfying relation (2).

Figure 8:
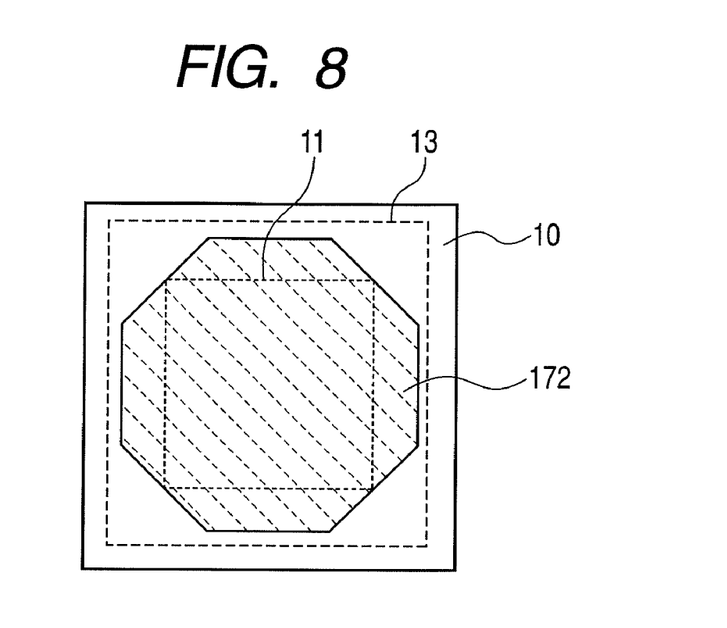
FIG. 8 is a view illustrating another shape of a first adhesive layer according to the present invention.

FIG. 8 illustrates another embodiment of the present invention. In this example, the first adhesive layer 172 has a shape obtained by linearly cutting each of four corner portions from the same rectangular shape as in FIG. 7. Thus, flexibility to stress increases by an amount corresponding to having no adhesive layer arrangement at the four corner portions, thus further suppressing an adverse effect upon the scintillator layer.

Figure 9:
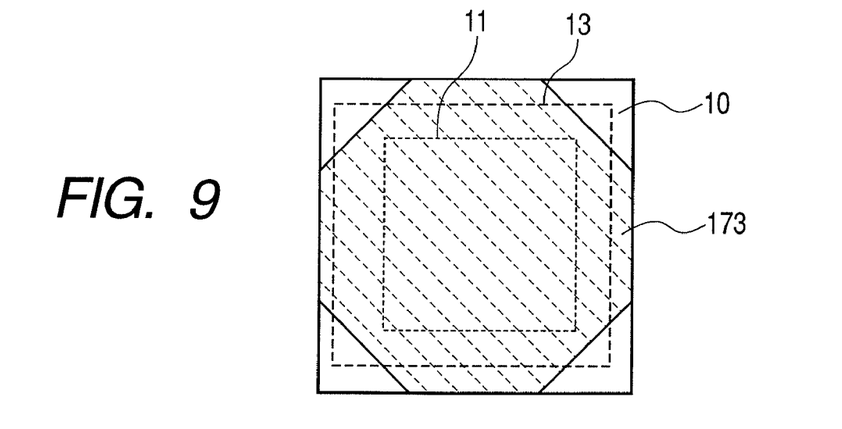
FIG. 9 is a view illustrating another shape of a first adhesive layer according to the present invention.

FIG. 9 illustrates still another embodiment. In this example, an adhesive layer 173 has such a shape that only four corner portions are linearly cut-off from the whole surface of the resin layer 18 in a rectangular region, respectively. In this case, only the four corner portions in a cut-off region satisfy relation (1). Stress becomes maximum in a diagonal direction. Accordingly, to a cut end portion with little stress, the resin layer 18 is connected using adhesive agent, which enables reinforcement against an external force from the top of the X-ray detecting apparatus and high quality at the corner portions.

Figure 10:
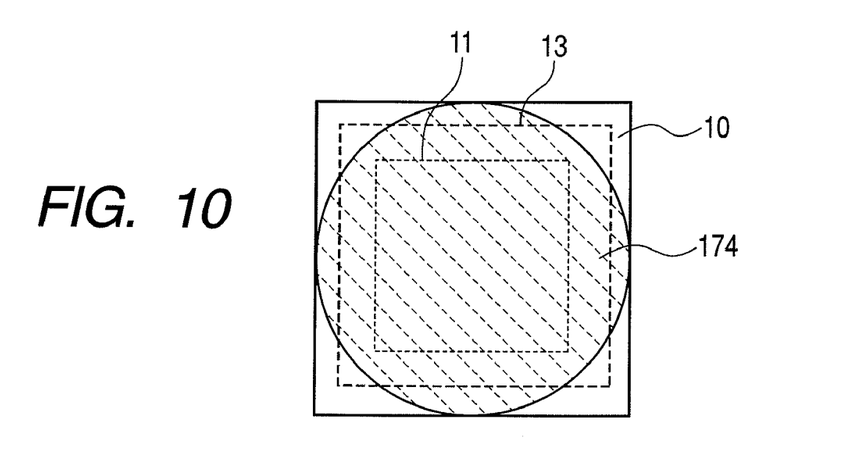
FIG. 10 is a view illustrating another shape of a first adhesive layer according to the present invention.
Figure 11:
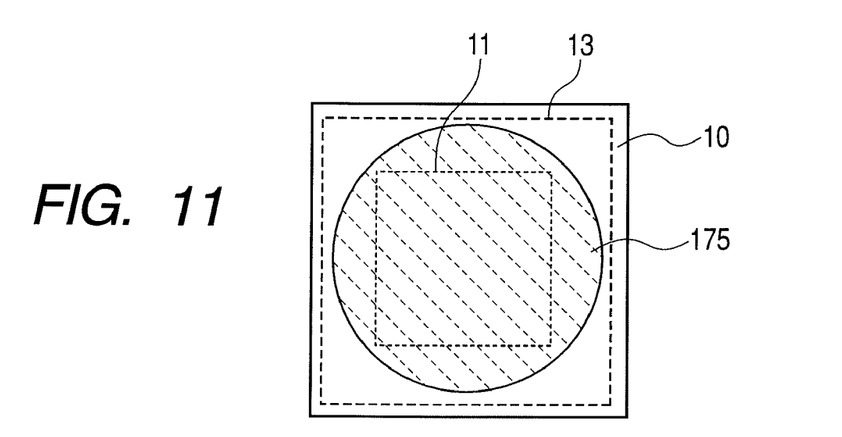
FIG. 11 is a view illustrating another shape of a first adhesive layer according to the present invention.

FIGS. 10 and 11 illustrate further embodiments. An adhesive layer 174 in FIG. 10 has a circular shape that satisfies relation (1) only at the four corner portions of the array substrate 10. Specifically, the adhesive layer has a circular shape inscribing the resin layer 18 of a rectangular shape. On the other hand, an adhesive layer 175 in FIG. 11 has a circular shape inward from the region of the rectangular array substrate 10. Accordingly, the adhesive layer 175 satisfies relation (1) at the four corner portions of the array substrate 10 as well as in other regions. Both embodiments provide the same effect as the embodiment described above.

In FIGS. 8 to 11, in the case of an apparatus configuration in FIG. 3, the resin layer 18 is disposed in a region equivalent to the array substrate 10.

In the present invention, the scintillator layer 13 is not limited to having a columnar crystal structure formed by vapor depositing CsI added with Tl on the insulation layer 12. In addition, a scintillator formed by compressing grain such as GOS with binder may be stuck to the insulation layer 12 together using adhesive agent or the like. In that case, adhesiveness between connection portions of the scintillator layer 13 and the insulation layer 12, or adhesiveness between particles in the scintillator layer is apt to cause problems such as an adverse effect of stress, peeling and cohesive failure in the radiation detecting apparatus. However, adoption of the present invention can suppress the adverse effect of stress, thus solving problems such as peeling and cohesive failure of the scintillator layer.

Applied Example

Figure 12:
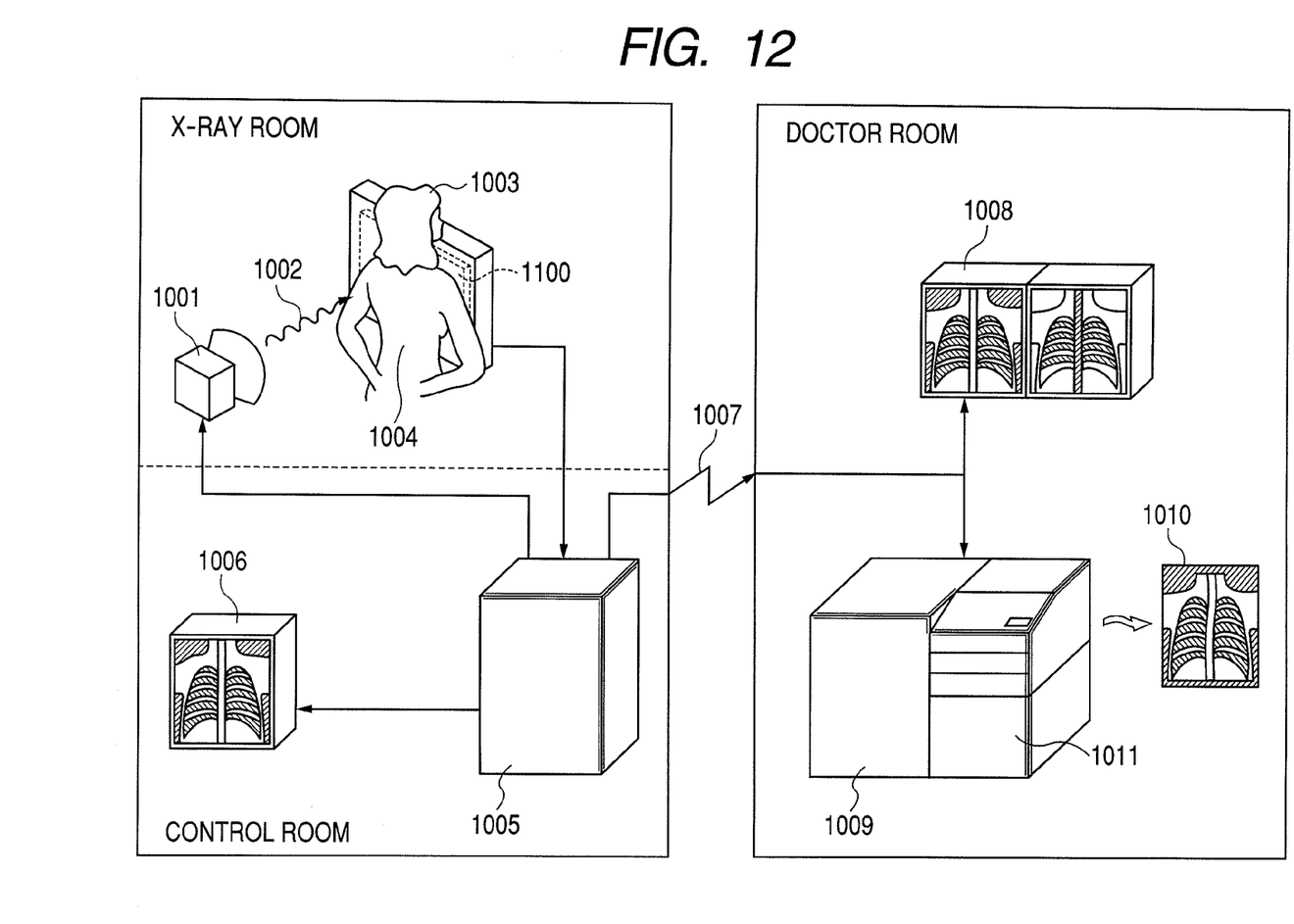
FIG. 12 is a schematic view of a radiographic inspection system according to the present invention.

Referring next to FIG. 12, description will be made of an applied example where the radiation detecting apparatus according to the embodiment of the present invention is applied to a radiation detecting system as an image diagnostic system.

The radiation 1002 generated at a radiation tube (radiation source) 1001 passes through a portion 1004 of the body, such as the chest of a person to be inspected 1003 like a patient and enters a radiation imaging apparatus 1100 with a scintillator mounted on the top thereof. The incident radiation 1002 includes information of the internal body of the person to be inspected 1003. In the radiation imaging apparatus 1100, the scintillator illuminates in response to the incidence of radiation 1002, which is subjected to photoelectric conversion to obtain electrical information. In addition, the radiation imaging apparatus 1100 may convert radiation 1002 directly into charges to obtain electrical information. The electrical information is converted into digital (signal), subjected to image processing by an image processor 1005 as a signal processing unit and displayed on a display 1006 as a display unit in a control room.

In addition, the electrical information can be transferred to a distant place through a transmission unit 1007 such as radio transmission or wire transmission such as telephone line. Accordingly, the information can be displayed on a display 1008 as a display unit installed at a doctor room or the like provided in a separate place, or can be stored in a recording medium such as optical disk by a film processor 1009 as a recording unit. This permits a doctor at a distant place to diagnose a patient. The film processor 1009, connected with a laser printer as a printing unit, can record information transmitted by the transmission unit 1007 in a recording medium such as film.

As many apparently widely different embodiments of the present invention can be made without departing from the spirit and scope thereof, it is to be understood that the invention is not limited to the specific embodiments thereof except as defined in the claims.

This application claims the benefit of Japanese Patent Applications Nos. 2007-109469, filed Apr. 18, 2007, and 2008-083387, filed Mar. 27, 2008, which are hereby incorporated by reference herein in their entirety.

The invention claimed is:

1. A radiation detecting apparatus comprising a laminating layered structure having a supporting substance, a first adhesive layer, an array substrate having a photoelectric conversion element, a scintillator layer for converting radiation into light, and a first resin layer are stacked in this order, wherein,
in a cross-sectional plane crossing said supporting substance, first adhesive layer, array substrate, scintillator layer and first resin layer, a width of an arrangement region of said scintillator layer is broader than a width of an arrangement region of said photoelectric conversion element,
a width of an arrangement region of said first adhesive layer is the same as or broader than the width of an arrangement region of said photoelectric conversion element, and narrower than the width of said arrangement region of said scintillator layer,
a width of an arrangement region of said array substrate is broader than the width of said arrangement region of said scintillator layer, and
said arrangement regions of said supporting substance, said first adhesive layer, said array substrate, said scintillator layer and said first resin layer are regions where said supporting substance, said first adhesive layer, said array substrate, said scintillator layer and said first resin layer are projected on said supporting substance.

2. The radiation detecting apparatus according to claim 1, wherein said arrangement region of the scintillator layer has a rectangular shape, and the portion of said arrangement region of said first adhesive layer disposed inward relative to said arrangement region of said scintillator layer is a corner portion of said scintillator layer.

3. The radiation detecting apparatus according to claim 1, wherein said array substrate and said scintillator layer have a rectangular shape, and said first adhesive layer is arranged at an area inside of said scintillator layer in an arrangement configuration of a rectangular shape like said scintillator layer.

4. The radiation detecting apparatus according to claim 1, wherein said array substrate and said scintillator layer have a rectangular shape, and said first adhesive layer is arranged inside of said scintillator layer to have a shape of a rectangle whose four corner areas are respectively cut linearly.

5. The radiation detecting apparatus according to claim 2, wherein said array substrate has a rectangular shape, and said first adhesive layer is arranged to have a shape of which four corner areas corresponding to the whole rectangular shape of said array substrate are respectively cut linearly.

6. The radiation detecting apparatus according to claim 2, wherein said array substrate has a rectangular shape, and said first adhesive layer is arranged to have a circular shape inscribing the array substrate of the rectangular shape.

7. The radiation detecting apparatus according to claim 3, wherein said array substrate and said scintillator layer have a rectangular shape, and said first adhesive layer is arranged to have a circular shape inside of the edge of said scintillator layer of said rectangular shape.

8. The radiation detecting apparatus according to claim 1, further comprising a second resin layer arranged between said first adhesive layer and said array substrate, and a second adhesive layer arranged between said second adhesive layer and said array substrate, wherein an arrangement region of said second resin layer and said second adhesive layer is disposed outward relative to said arrangement region of said scintillator layer.

9. The radiation detecting apparatus according to claim 8, wherein said arrangement region of said scintillator layer has a rectangular shape, and the portion of said arrangement region of said first adhesive layer disposed inward relative to said arrangement region of said scintillator layer is a corner portion of said scintillator layer.

10. The radiation detecting apparatus according to claim 8, wherein said second resin layer and said scintillator layer have a rectangular shape, and said first adhesive layer is arranged at an inside area of said second resin layer in an arrangement configuration of a rectangular shape like said second resin layer.

11. The radiation detecting apparatus according to claim 8, wherein said second resin layer and said scintillator layer have a rectangular shape, and said first adhesive layer is arranged at an inside area of said second resin layer to have a shape of a rectangle whose four corner areas are respectively cut linearly.

12. The radiation detecting apparatus according to claim 9, wherein said second resin layer and said scintillator layer have a rectangular shape, and said first adhesive layer is arranged to have a shape four corner areas of which corresponding to the whole rectangular shape of said second resin layer are respectively cut linearly.

13. The radiation detecting apparatus according to claim 9, wherein said second resin layer and said scintillator layer have a rectangular shape, and the said adhesive layer is arranged to have a circular shape in which said second resin layer of the rectangular shape is inscribed.

14. The radiation detecting apparatus according to claim 8, wherein said second resin layer and said scintillator layer have a rectangular shape, and said first adhesive layer is arranged to have a circular shape inside of said second resin layer of the rectangular shape.

15. The radiation detecting apparatus according to claim 8, wherein said first and second adhesive layers are formed from a material selected from an acryl series, an epoxy series or a silicone series group.

16. The radiation detecting apparatus according to claim 1, wherein said scintillator layer has a structure wherein an activator is added to a main ingredient.

17. The radiation detecting apparatus according to claim 5, wherein said scintillator layer has a columnar crystal structure.

18. The radiation detecting apparatus according to claim 16, wherein said main ingredient is cesium iodide.

19. The radiation detecting apparatus according to claim 16, wherein said activator is thallium.

20. The radiation detecting apparatus according to claim 8, wherein said second resin layer has a light-shielding performance.

21. The radiation detecting apparatus according to claim 8, wherein said second resin layer has a buffering performance.

22. A radiation detecting system comprising:
a radiation detecting apparatus according to claim 1; and
a signal processing unit for processing a signal from said radiation detecting apparatus.

* * * * *